United States Patent
Kwak et al.

(10) Patent No.: US 9,608,256 B2
(45) Date of Patent: Mar. 28, 2017

(54) RECHARGEABLE BATTERY

(71) Applicant: Samsung SDI Co., Ltd., Yongin-si, Gyeonggi-do (KR)

(72) Inventors: Seung-Ho Kwak, Yongin-si (KR); Hui-Jun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 170 days.

(21) Appl. No.: 14/135,339

(22) Filed: Dec. 19, 2013

(65) Prior Publication Data
US 2014/0377638 A1 Dec. 25, 2014

(30) Foreign Application Priority Data
Jun. 25, 2013 (KR) .................. 10-2013-0073096

(51) Int. Cl.
*H01M 2/40* (2006.01)
*H01M 2/34* (2006.01)
(Continued)

(52) U.S. Cl.
CPC ............ *H01M 2/34* (2013.01); *H01M 2/1241* (2013.01); *H01M 2/1252* (2013.01); *H01M 2/0217* (2013.01); *H01M 2200/103* (2013.01)

(58) Field of Classification Search
CPC .......... H01M 2/34; H01M 10/42; H01M 2/26; H01M 2/12
(Continued)

(56) References Cited

U.S. PATENT DOCUMENTS

2010/0323239 A1* 12/2010 Kim .............................. 429/181
2011/0200865 A1  8/2011 Byun et al.
(Continued)

FOREIGN PATENT DOCUMENTS

EP  2 544 264 A1  1/2013
EP  2 544 265 A1  1/2013
(Continued)

OTHER PUBLICATIONS

EPO Search Report dated Jun. 17, 2014, for corresponding European Patent application 14160862.0, (4 pages).
(Continued)

*Primary Examiner* — James Lee
(74) *Attorney, Agent, or Firm* — Lewis Roca Rothgerber Christie LLP (57) ABSTRACT

The described technology has been made in an effort to provide a rechargeable battery having advantages of protecting an electrode assembly and a case from arc debris generated from a cell fuse. A rechargeable battery in accordance with exemplary embodiment includes: an electrode assembly configured to perform charging and discharging operations; a case configured to accommodate the electrode assembly therein; a cap plate coupled to an opening of the case; an electrode terminal installed on the cap plate; a lead tab configured to connect the electrode assembly to the electrode terminal, and including a fuse; and a side retainer supported in an inner surface of the case to be coupled to the lead tab. The side retainer includes an exhaust guide member that is opened toward the cell fuse and a sidewall of the case.

14 Claims, 5 Drawing Sheets

(51) Int. Cl.
*H01M 2/12* (2006.01)
*H01M 2/02* (2006.01)

(58) Field of Classification Search
USPC .................................................... 429/178, 61
See application file for complete search history.

(56) References Cited

U.S. PATENT DOCUMENTS

| | | |
|---|---|---|
| 2011/0244281 A1* | 10/2011 | Byun .............................. 429/62 |
| 2011/0250491 A1 | 10/2011 | Kim et al. |
| 2011/0311851 A1* | 12/2011 | Shinoda ................ H01M 2/263 |
| | | 429/94 |
| 2012/0282502 A1 | 11/2012 | Kim |
| 2013/0136961 A1 | 5/2013 | Han et al. |

FOREIGN PATENT DOCUMENTS

| | | |
|---|---|---|
| EP | 2 579 357 A1 | 4/2013 |
| EP | 2 581 965 A1 | 4/2013 |
| EP | 2 587 567 A1 | 5/2013 |
| KR | 10-2011-0095108 A | 8/2011 |
| KR | 10-2011-0114411 | 10/2011 |
| KR | 10-2012-0124026 A | 11/2012 |

OTHER PUBLICATIONS

EPO Office action dated Sep. 14, 2015, for corresponding European Patent application 14160862.0, (3 pages).
KIPO Office Action dated Aug. 10, 2016 for corresponding Korean Patent Application No. 10-2013-0073096, (8 pages).

\* cited by examiner

RECHARGEABLE BATTERY

CROSS-REFERENCE TO RELATED APPLICATION

This application claims priority to and the benefit of Korean Patent Application No. 10-2013-0073096 filed in the Korean Intellectual Property Office on Jun. 25, 2013, the entire contents of which are incorporated herein by reference.

BACKGROUND

1. Field

The present disclosure relates to a rechargeable battery for protecting an electrode assembly and a case from an arc generated from a cell fuse.

2. Description of the Related Art

A rechargeable battery is a battery that can be repeatedly charged and discharged. A low-capacity rechargeable battery is used for small portable electronic devices such as a mobile phone, a notebook computer, and a camcorder, and a large-capacity rechargeable battery is used as a power supply for driving a motor such as for a hybrid car.

For example, a rechargeable battery includes an electrode assembly for performing charging and discharging operations, a case accommodating the electrode assembly, a cap plate coupled to an opening of the case, and a lead tab for electrically connecting the electrode assembly to an electrode terminal.

In the rechargeable battery, the lead tab has a fuse formed between a part connected to the electrode assembly and a part connected to the electrode terminal. For example, the fuse melts under a high-voltage condition, such as an external short-circuit, to thus interrupt current.

Arc debris generated when the fuse is operated (melted) may penetrate inside the electrode assembly thereby damaging the electrode assembly or fly into a lateral side or a lower side of the electrode assembly, thereby damaging the lateral side or the lower side of the electrode assembly.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery configured to protect an electrode assembly and a case from arc debris generated from a cell fuse.

An exemplary embodiment provides a rechargeable battery, including: an electrode assembly configured to perform charging and discharging operations; a case configured to accommodate the electrode assembly therein; a cap plate coupled to an opening of the case; an electrode terminal installed on the cap plate; a lead tab configured to connect the electrode assembly to the electrode terminal, and including a fuse; and a side retainer supported in an inner surface of the case to be coupled to the lead tab. The side retainer includes an exhaust guide member that is opened toward the cell fuse and a sidewall of the case.

The side retainer may further include an inserting guide member which is extended to an opposite side to the cap plate and inclined adjacent to the electrode assembly.

The lead tab may include: a first connection part having a first portion, parallel with the cap plate, connected to the electrode terminal, and a second portion bent from the first portion in a direction crossing the cap plate; and a plurality of second connection parts branched from the first connection part and brought into surface-contact with and welded to a side surface of an uncoated region of the electrode assembly.

The side retainer may include: a first side surface which covers a side surface of the lead tab in a direction facing an end surface of an uncoated region of the electrode assembly; and a second surface and a third surface respectively protruded from opposite sides of the first surface and coupled to an inner surface thereof via an end surface of the lead tab.

The inserting guide member may obliquely connect the first side surface to the second side surface and the third side surface which are obliquely formed toward the electrode assembly.

The second side surface and the third side surface respectively may include catching protrusions caught by an inner surface of the lead tab via an end surface of the lead tab.

The first side surface may have a reinforced portion at an inner surface thereof, the reinforced portion being formed to be thicker than ambient thickness.

The exhaust guide member may include: a first opening extended through the first side surface; a second opening protruded from the first opening to a gap between the second surface and the third surface to face the cell fuse; a vertical portion which forms the second opening; and an inclined portion which connects a lower end of the vertical portion to the first opening The exhaust guide member may include an upper exhaust guide member and a lower exhaust guide member according to a height direction toward the cell fuse in the first side surface.

The vertical portion of the upper exhaust guide member may be formed to be longer than the vertical portion of the lower exhaust guide member.

The inclined portion of the upper exhaust guide member may be formed more steeply than the inclined portion of the lower exhaust guide member.

The vertical portion may include: a fourth side surface formed at the rear of the first opening toward the electrode assembly and in parallel with the first side surface; and a fifth side surface and a sixth side surface connected to the second opening opposite to the second side surface and the third side surface, respectively.

The fifth side surface and the sixth side surface may have a pair of cut-outs that are formed horizontally in parallel with each other, and middle portions between the pair of cut-outs may be protruded toward the second and third side surfaces more than portions over and under the cut-outs The middle portions between the pair of cut-outs may respectively have protrusions that are in parallel with the cut-outs and are protruded more toward the second and third side surfaces.

In accordance with an exemplary embodiment, a side retainer includes an exhaust guide member, and the exhaust guide member is opened toward a cell fuse and a sidewall of the case. Accordingly, arc debris generated from the cell fuse can be collected in the exhaust guide member or guided to a space between the side retainer and the case. Therefore, it is possible to protect the electrode assembly and the case from the arc debris generated when the cell fuse is operated (melted).

DETAILED DESCRIPTION

In the following detailed description, certain exemplary embodiments have been shown and described, simply by way of illustration. As those skilled in the art would realize, the described embodiments may be modified in various different ways, all without departing from the spirit or scope of the present invention. In the drawings, parts or elements that are not related to the description hereof are omitted in order to clearly describe the present invention, and the same or like constituent elements designate the same reference numerals throughout the specification.

Figure 1:
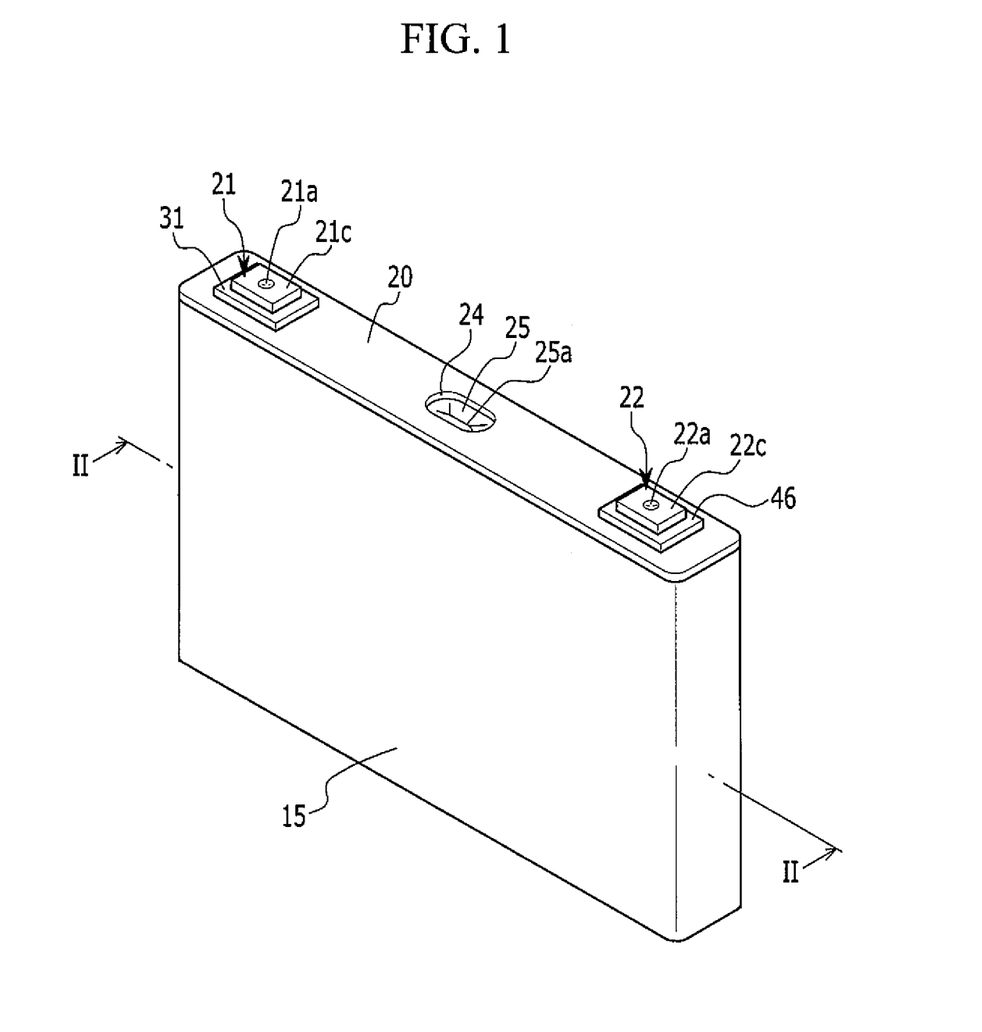
FIG. 1 is a perspective view of a rechargeable battery in accordance with a first exemplary embodiment.
Figure 2:
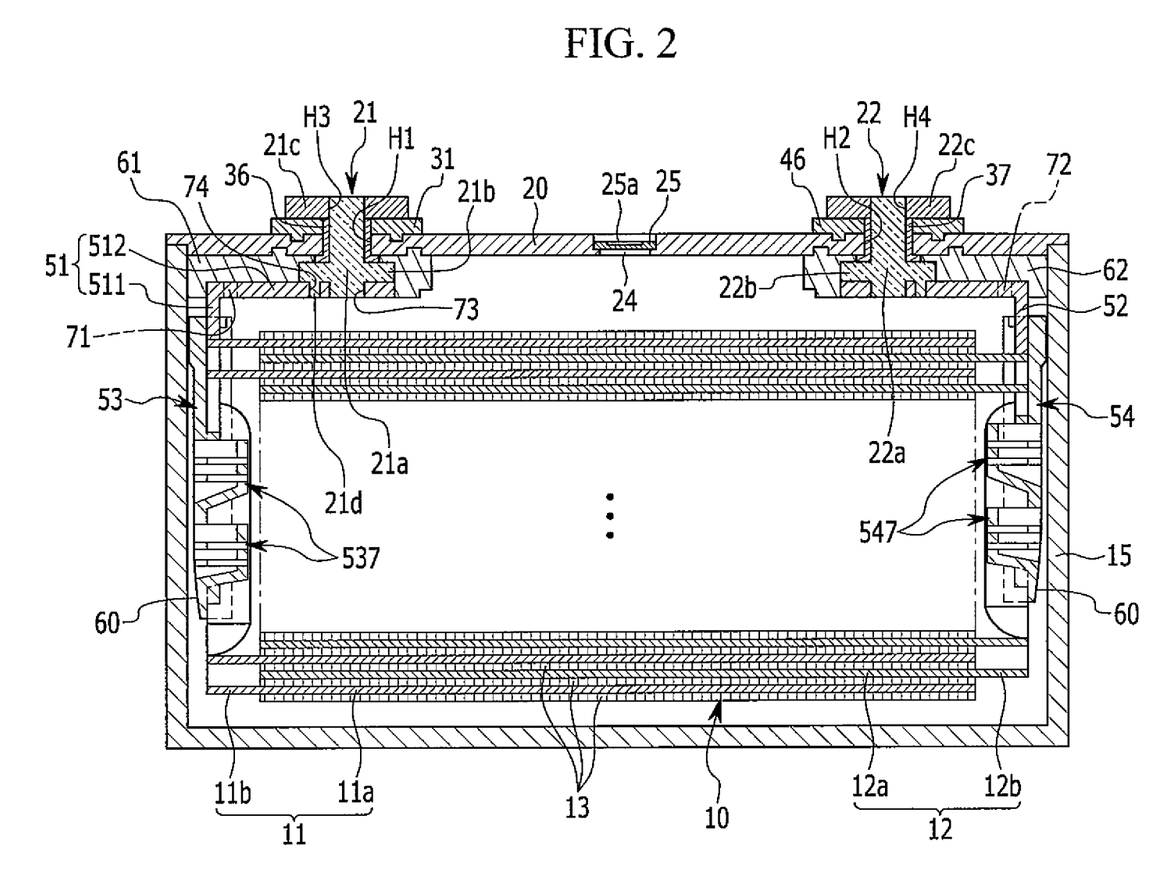
FIG. 2 is a cross-sectional view taken along line II-II of FIG. 1.

FIG. 1 is a perspective view of a rechargeable battery in accordance with a first exemplary embodiment, and FIG. 2 is a cross-sectional view taken along line II-II of FIG. 1.

Referring to FIG. 1 and FIG. 2, a rechargeable battery in accordance with an exemplary embodiment includes: an electrode assembly 10 for performing charging and discharging operations; a case 15 accommodating the electrode assembly 10 and electrolyte therein; a cap plate 20 coupled to an opening of the case 15; electrode terminals 21 and 22 respectively installed in terminal holes H1 and H2 of the cap plate 20; and lead tabs 51 and 52 connecting the electrode terminals 21 and 22 to the electrode assembly 10. Further, the rechargeable battery further includes side retainers 53 and 54 supported at an inner surface of the case 15 and connected to the lead tabs 51 and 52.

For example, the electrode assembly 10 is formed by disposing electrodes (e.g., a negative electrode 11 and a positive electrode 12) on opposite surfaces of a separator 13, which is an insulator, and winding the negative electrode 11, the separator 13, and the positive electrode 12 in a jelly-roll shape.

The negative and positive electrodes 11 and 12 include coated regions 11a and 12a formed by applying an active material to a current collector of a metal plate, and uncoated regions 11b and 12b, which are exposed portions of the current collector to which the active material is not applied.

The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12. The uncoated regions 11b and 12b are respectively disposed at opposite ends of the electrode assembly 10.

The case 15 can have an approximately cuboid shape in such a way so as to define an internal space thereof for housing the electrode assembly 10. An opening for connecting external and internal spaces can be formed on one side of the cuboid. The electrode assembly 10 is inserted into the case 15 through the opening.

The cap plate 20 is installed in the opening of the case 15 to close and seal the case 15. For example, the case 15 and the cap plate 20 may be made of aluminum and be welded to each other. That is, after the electrode assembly 10 is inserted into the case 15, the cap plate 20 may be welded to the opening of the case 15.

The cap plate 20 has at least one opening, for example, the terminal holes H1 and H2 and a vent hole 24. The electrode terminals 21 and 22 are respectively installed in the terminal holes H1 and H2 of the cap plate 20, and electrically connected to the electrode assembly 10.

That is, the electrode terminals 21 and 22 are electrically connected to the negative electrode 11 and positive electrode 12 of the electrode assembly 10, respectively. Accordingly, the electrode assembly 10 may be drawn out of the case 15 through the electrode terminals 21 and 22.

The electrode terminals 21 and 22 include plate terminals 21c and 22c provided on the outside of the cap plate 20, corresponding to the terminal holes H1 and H2, and rivet terminals 21a and 22a electrically connected to the electrode assembly 10 and fastened to the plate terminals 21c and 22c through the terminals holes H1 and H2.

The plate terminals 21c and 22c respectively have through holes H3 and H4. The rivet terminals 21a and 22a are extended through the terminal holes H1 and H2 and inserted into the through holes H3 and H4, respectively. The electrode terminals 21 and 22 further include flanges 21b and 22b, respectively, extended integrally with the rivet terminals 21a and 22a inside the cap plate 20.

At the electrode terminal 21 to be connected to the negative electrode 11, an external insulating member 31 is located between the plate terminal 21c and the cap plate 20, thus electrically insulating the plate terminal 21c from the cap plate 20. That is, the cap plate 20 remains electrically insulated from the electrode assembly 10 and the negative electrode 11.

The insulating member 31 and the plate terminal 21c are fastened to the upper end of the rivet terminal 21a by coupling the insulating member 31 and the plate terminal 21c to the upper end of the rivet terminal 21a and riveting or welding the upper end. The plate terminal 21c is installed at the outside of the cap plate 20, with the insulating member 31 located therebetween.

At the electrode terminal 22 to be connected to the positive electrode 12, a conductive top plate 46 is located between the plate terminal 22c and the cap plate 20, thus electrically connecting the plate terminal 22c with the cap plate 20. In other words, the cap plate 20 remains electrically connected to the positive terminal 22.

The top plate 46 and the plate terminal 22c are fastened to the upper end of the rivet terminal 22a by coupling the top plate 46 and the plate terminal 22c to the upper end of the rivet terminal 22a and riveting or welding the upper end. The plate terminal 22c is installed at the outside of the cap plate 20, with the top plate 46 located therebetween.

Gaskets 36 and 37 are located between the rivet terminals 21a and 22a of the electrode terminals 21 and 22 and the inner surfaces of the terminal holes H1 and H2 of the cap plate 20, to seal and electrically insulate between the rivet terminals 21a and 22a and the cap plate 20.

The gaskets 36 and 37 are more extendedly mounted between the flanges 21b and 22b and the inner surface of the cap plate 20 to better seal and electrically insulate between the flanges 21b and 22b and the cap plate 20. The gaskets 36 and 37 allow the electrode terminals 21 and 22 to be installed on the cap plate 20 while preventing the electrolyte from leaking through the terminal holes H1 and H2.

The lead tabs 51 and 52 respectively electrically connect the electrode terminals 21 and 22 to the negative and positive electrodes 11 and 12 of the electrode assembly 10. In other words, the lead tabs 51 and 52 are connected to the lower ends of the rivet terminals 21a and 22a while being supported by the flanges 21b and 22b, by coupling the lead tabs 51 and 52 to the lower ends of the rivet terminals 21a and 22a to caulk the lower ends thereof.

The lead tabs 51 and 52 further include cell fuses 71 and 72, respectively, to interrupt current between the electrode terminals 21 and 22 and the electrode assembly 10. In other words, the cell fuses 71 and 72 are operated (melted) under a high voltage condition such as an external short-circuit so as to control currents.

As shown in the drawings, the fuses 71 and 72 may be formed at the negative electrode 11 and positive electrode 12 of the electrode assembly 10. Otherwise, they may be selectively formed at the negative electrode 11 or the positive electrode 12.

Insulating members 61 and 62 are respectively installed between the lead tabs 51 and 52 and the cap plate 20 to electrically insulate the lead tabs 51 and 52 form the cap plate 20. In addition, one side of each of the insulating members 61 and 62 is coupled to the cap plate 20 and the other side thereof surrounds the lead tabs 51 and 52, the rivet terminals 21a and 22a, and the flanges 21b and 22b, thereby stabilizing the connection structure thereof.

The vent hole 24 is closed and sealed by a vent plate 25 so as to discharge an internal pressure of the rechargeable battery and gases generated in the rechargeable battery. When the internal pressure of the rechargeable battery reaches a predetermined value, the vent plate 25 is ruptured to open the vent hole 24. The vent plate 25 has a notch 25a for inducing the rupturing.

In one embodiment, the side retainers 53 and 54 are respectively coupled to the lead tabs 51 and 52 and located between the electrode assembly 10 and the case 15 to separate the electrode assembly 10 from the case 15. Accordingly, the side retainers 53 and 54 can serve to protect the electrode assembly 10 from an external impact transferred through the case 15. For example, the side retainers 53 and 54 may be made of a synthetic resin material having high thermal resistance.

The side retainers 53 and 54 respectively include exhaust guide members 537 and 547 that are opened toward the cell fuses 71 and 72 and a sidewall of the case 15. The exhaust guide members 537 and 547 are formed in such a way so as to collect arc debris generated when the cell fuses 71 and 72 are operated (melted) or guide the arc debris between the side retainers 53 and 54 and the case 15.

Specifically, a small amount of arc debris may be collected on the exhaust guide members 537 and 547 while a large amount of arc debris may be exhausted by the exhaust guide members 537 and 547. Accordingly, the arc debris does not penetrate inside the electrode assembly 10 and does not fall down directly to the sidewall or the bottom of the case 15.

Each of the side retainers 53 and 54 includes an inserting guide member 60 which is extended to an opposite side to the cap plate 20 and inclined adjacent to the electrode assembly 10. The inserting guide member 60 can easily guide the insertion of the electrode assembly 10 into the opening of the case 15 by forming a distance with the opening of the case 15 through a narrow side portion thereof.

Further, the side retainers 53 and 54 are brought into contact with the opening of the case 15 at the outside of the electrode assembly 10 to thereby prevent end portions of the lead tab 51 and 52 and the electrode assembly 10 from being brought into contact with the opening of the case 15. As a result, damage to the electrode assembly 10 caused by the opening of the case 15 can be prevented.

In the first exemplary embodiment, the lead tabs 51 and 52 have mirroring configurations, and the side retainers 53 and 54 have mirroring configurations. Accordingly, the lead tab 51 connected to the negative electrode 11 of the electrode assembly 10 and the side retainer 53 coupled to the lead tab 51 will be described below as examples for the sake of convenience.

Figure 3:
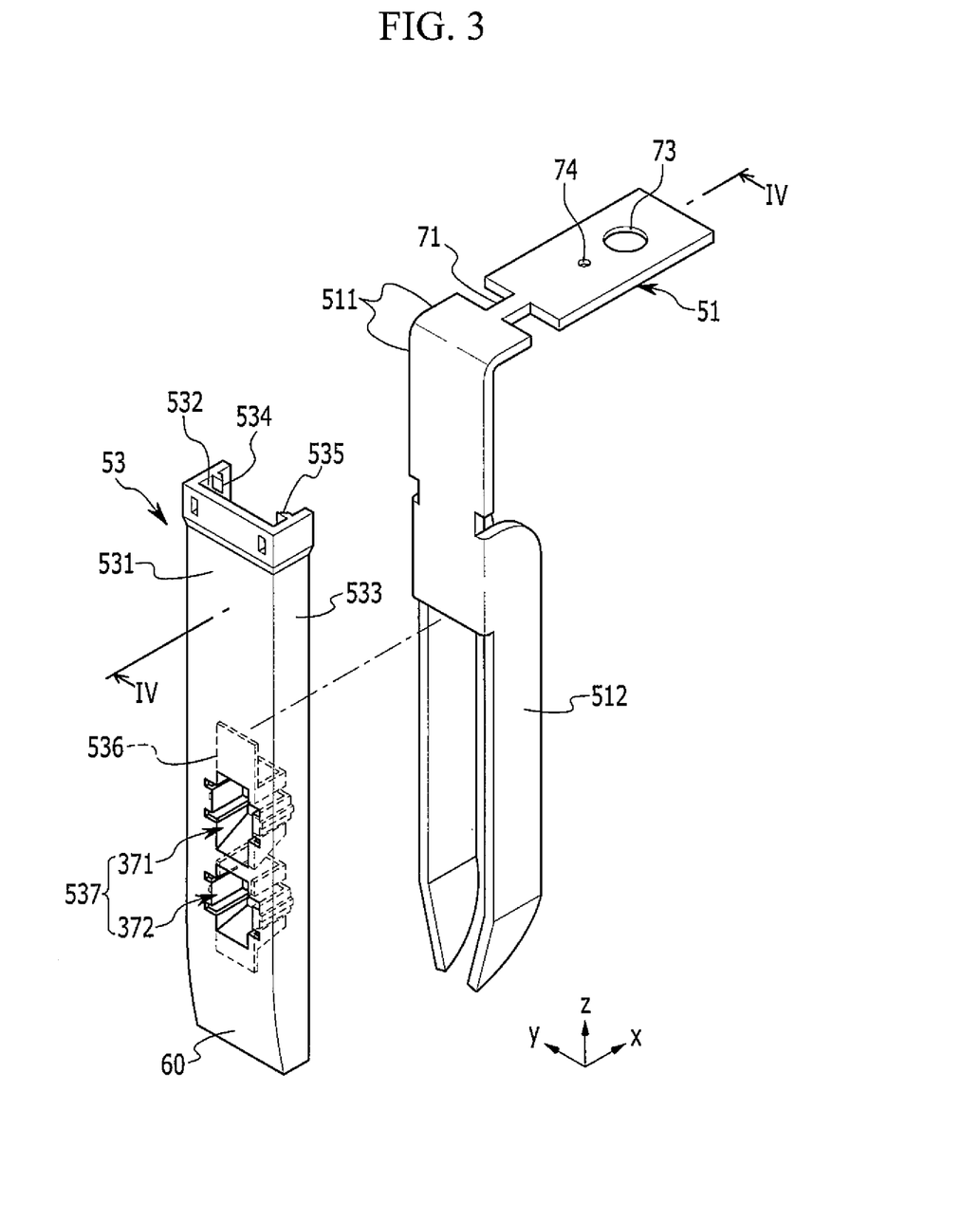
FIG. 3 is an exploded perspective view of a lead tab and a side retainer shown in FIG. 2.
Figure 4:
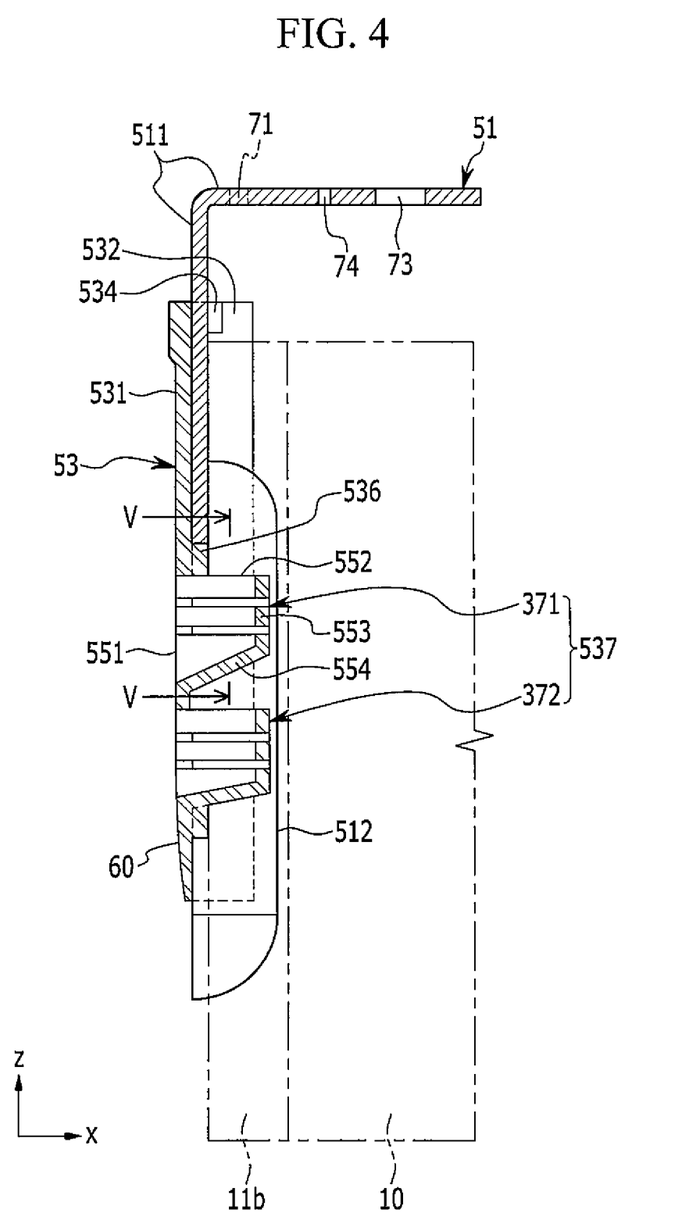
FIG. 4 is a cross-sectional view taken along line IV-IV of FIG. 3.

FIG. 3 is an exploded perspective view of a lead tab and a side retainer shown in FIG. 2. FIG. 4 is a cross-sectional view taken along line IV-IV of FIG. 3, and FIG. 5 is a cross-sectional view taken along line V-V of FIG. 4.

Figure 5:
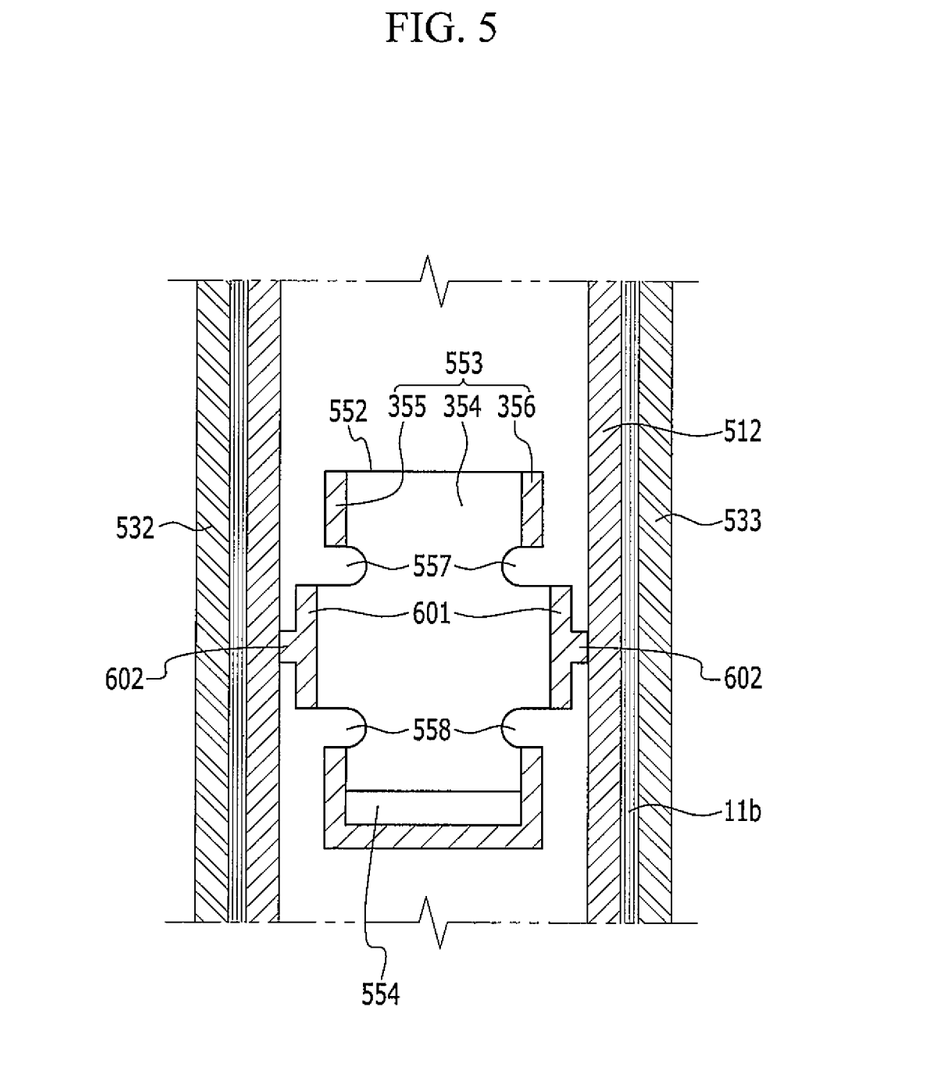
FIG. 5 is a cross-sectional view taken along line V-V of FIG. 4.

Referring to FIG. 3 to FIG. 5, the lead tab 51 includes a first connection part 511 having a first portion parallel with the cap plate 20 and connected to the electrode terminal 21, and a second portion bent from the first portion in a direction crossing the cap plate 20; and one or more second connection parts 512 branched from the first connection part 511 and brought into surface-contact with and welded to a side surface of the uncoated region 11b of the electrode assembly 10.

The first portion of the first connection part 511 has pass-through slots 73 and 74 so as to be coupled to a lower end of the rivet terminal 21a and a lower protrusion 21d of the flange 21b. The cell fuse 71 is formed to have a narrower area at the first connection part 511 than an ambient area so that its electrical resistance is higher than ambient resistance.

The side retainer 53 has a first side surface 531 which covers the side surface of the lead tab 51 in a direction (x axis direction) facing an end surface of the uncoated region 11b of the electrode assembly 10, and a second side surface 532 and a third side surface 533 respectively protruded from opposite sides of the first surface 531 and coupled to an inner surface thereof via an end surface of the lead tab 51.

In other words, the side retainer 53 is concavely formed toward the lead tab 51 to thereby accommodate the lead tab 51. The first side surface 531 covers a wide side surface at the first connection part 511 of the lead tab 51 and a narrow end surface at the second connection part 512 thereof. The second and third side surfaces 532 and 533 cover a narrow end surface at the first connection part 511 of the lead tab 51 and a wide side surface at the second connection part 512 thereof.

The inserting guide member 60 is formed by obliquely connecting the first side surface 531 to the second side surface 532 and the third side surface 533 which are obliquely formed toward the electrode assembly 10. In other words, in FIG. 3 and FIG. 4, the first side surface 531 becomes closer to the electrode assembly 10 from top to bottom.

Accordingly, when the electrode assembly 10 is inserted into the case 15, a distance between the side retainer 53 and the opening of the case 15 is defined by the inserting guide member 60. Such a distance facilitates the insertion of the electrode assembly 10 into the opening of the case 15.

Further, the electrode assembly 10 and the lead tab 51 surrounded by the inserting guide member 60 are not brought into contact with the opening of the case 15. Accordingly, it is possible to prevent damage to the electrode assembly 10 in an assembling operation.

The second and third side surfaces 532 and 533 respectively include catching protrusions 534 and 535 in opposite inner surfaces thereof. The catching protrusions 534 and 535 are engaged by an inner surface of the lead tab 52 via the end surface of the first connection part 511 thereof, thereby fastening the side retainer 53 to the first connection part 511. In this case, the second and third side surfaces 532 and 533 cover not only the end surface of the first connection part 511 but also the side surface of the second connection part 512.

The first side surface 531 has a reinforced portion 536 in an inner surface thereof, the reinforced portion 536 being formed to be thicker than other portions of the lead tab. When the first side surface 531 covers the side surface of the first connection part 511 and the end surface of second connection part 512, the reinforced portion 536 is inserted between the second connection parts and the catching protrusions 534 and 535 are adhered to the inner surface of the first connection part 511. As a result, the lead tab 51 and the side retainer 53 can maintain a strong coupling state therebetween.

The exhaust guide member 537 includes a first opening 551 extended through the first side surface 531; a second opening 552 protruded from the first opening 551 to a gap between the second surface 532 and the third surface 533 to face the cell fuse 71; a vertical portion 553 which forms the second opening 552; and an inclined portion 554 which connects a lower end of the vertical portion 553 to the first opening 551.

For example, the exhaust guide member 537 includes an upper exhaust guide member 371 and a lower exhaust guide member 372 with respect to a height direction toward the cell fuse 71 in the first side surface 531. Most arc debris generated from the cell fuse 71 when the cell fuse 71 is melted flows into the vertical portion 553 through the second opening 552 of the upper exhaust guide member 371 to be collected at the inclined portion 554 or to be exhausted from the inclined portion 554.

The vertical portion 553 of the upper exhaust guide member 371 is formed to be longer than the vertical portion 553 of the lower exhaust guide member 372. Accordingly, the arc debris generated from the cell fuse 71 can be sufficiently accepted in a large space of the inclined portion 554 of the upper exhaust guide member 371.

The inclined portion 554 of the upper exhaust guide member 371 is formed more steeply than the inclined portion 554 of the lower exhaust guide member 372. The arc debris collected in the upper exhaust guide member 371 is cooled and exhausted to a space between the side retainer 53 and the case 15.

The arc debris is blocked by the upper exhaust guide member 371 so as to not permeate into the electrode assembly 10. An arc debris amount that is over a collection capacity of the upper exhaust guide member 371 is exhausted to the space between the side retainer 53 and the case 15 through the inclined portion 554. However, since the excessively exhausted arc debris is in a cooled state, the inner wall and the bottom of the case 15 are not likely to be damaged by the arc debris.

In one embodiment, when the inclined portion 554 of the upper exhaust guide member 371 is melted into a hole, the arc debris can be collected in the lower exhaust guide member 372. Accordingly, the inner wall and the bottom of the case 15 are not damaged by the high-temperature arc debris that passes through the upper exhaust guide member 371. Therefore, the lower exhaust guide member 372 may be formed to have a smaller volume than the upper exhaust guide member 371.

Additionally as shown in FIG. 5, the vertical portion 553 includes a fourth side surface 354 formed at the rear of the first opening 551 toward the electrode assembly 10 and in parallel with the first side surface 531, and a fifth side surface 355 and a sixth side surface 356 connected to the second opening 552 opposite to the second side surface 532 and the third side surface 533, respectively. The fourth, fifth, and sixth side surfaces 354, 355, and 356 and the inclined portion 554 define a space of the vertical portion 553, between the first and second openings 551 and 552.

The fifth and sixth side surfaces 355 and 356 have a pair of cut-outs 557 and 558 that are formed horizontally in parallel with each other, and middle portions 601 between the pair of cut-outs 557 and 558 are protruded toward the second and third side surfaces 532 and 533 more than portions over and under the cut-outs 557 and 558. The middle portions 601 are elastically connected to the fifth and sixth side surfaces 355 and 356 so as to face an inner surface of the second connection part 512.

The middle portions 601 between the pair of cut-outs 557 and 558 respectively have protrusions 602 that are in parallel with the cut-outs 557 and 558 and are protruded more toward the second and third side surfaces 532 and 533. In the fifth and sixth side surfaces 355 and 356, the protrusions 602 substantially support each inner surface of the second connection parts 512 inside the second side surface 532 and the third side surface 533.

The protrusions 602 are respectively protruded at the middle portions 601, and project from the inside of the first side surface toward the second side surface 532 and the third side surface 533 to support opposite inner surfaces of the second connection parts 512 while being brought into line-contact therewith. Independently at portions over and under the cut-outs 557 and 558, the middle portions 601 are respectively elastically compressed to support the second connection part 512. Accordingly, the middle portions 601 can absorb distances between the fifth and sixth side surfaces 355 and 356 and the second connection parts 512. The protrusions 602 may be formed as one single unit, or they may be formed as a plurality of units.

In one embodiment, the uncoated regions 11b are located between the second connection part 512 and the second side surface 532, and between the second connection part 512 and the third side surface 533. The uncoated regions 11b are electrically connected to the second connection parts 512.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Symbols

| | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21, 22: electrode terminal | 21a, 22a: rivet terminal |
| 21b, 22b: flange | 21c, 22c: plate terminal |
| 21d, 602: protrusion | 24: vent hole |
| 25: vent plate | 25a: notch |
| 31, 61, 62: insulating member | 36, 37: gasket |
| 46: top plate | 51, 52: lead tab |
| 53, 54: side retainer | 60: inserting guide member |
| 71, 72: cell fuse | 73, 74: pass-through slot |
| 354, 355, 356: fourth, fifth, and sixth side surface | |
| 371, 372: upper, lower exhaust guide member | |
| 511, 512: first and second connection part | |
| 531, 532, 533: first, second, and third side surface | |
| 534, 535: catching protrusion | 536: reinforced portion |
| 537, 547: exhaust guide member | 551, 552: first and second opening |
| 553: vertical portion | 554: inclined portion |
| 557, 558: cut-out | H1, H2: terminal hole |

What is claimed is:

1. A rechargeable battery comprising:
an electrode assembly;
a case accommodating the electrode assembly therein;
a cap plate coupled to an opening of the case;
an electrode terminal on the cap plate;
a lead tab connecting the electrode assembly to the electrode terminal, the lead tab comprising a fuse; and
a side retainer supported by the case and coupled to the lead tab,
wherein the side retainer comprises a first exhaust guide member comprising an inclined portion and defining:
a first opening that is opened toward a sidewall of the case; and
a second opening that is opened toward the cell fuse,
the inclined portion extending from the first exhaust guide member at a lower portion of the first opening and extending toward the electrode assembly and toward the cap plate along an incline, and the first opening and the second opening being in communication with each other such that the first exhaust guide member is configured to collect exhaust debris generated when the cell fuse is operated and guide the exhaust debris between the side retainer and the side wall of the case via the second opening, the inclined portion, and the first opening.

2. The rechargeable battery of claim 1, wherein the side retainer further includes an inserting guide member which extends away from the cap plate and is inclined adjacent to the electrode assembly.

3. The rechargeable battery of claim 1, wherein the lead tab comprises:
a first connection part having a first portion parallel with the cap plate and connected to the electrode terminal,
a second portion bent from the first portion in a direction substantially perpendicular to the cap plate; and
a plurality of second connection parts branched from the first connection part and in surface-contact with and welded to a side surface of an uncoated region of the electrode assembly.

4. The rechargeable battery of claim 1, wherein the side retainer comprises:
a first side surface which covers a side surface of the lead tab in a direction facing an end surface of an uncoated region of the electrode assembly; and
a second side surface and a third side surface respectively protruding from opposite sides of the first side surface and coupled to an inner surface thereof via an end surface of the lead tab.

5. The rechargeable battery of claim 4, wherein the side retainer further comprises an inserting guide member that obliquely connects the first side surface to the second side surface and the third side surface which are obliquely formed toward the electrode assembly.

6. The rechargeable battery of claim 4, wherein the second side surface and the third side surface respectively include catching protrusions engaging an inner surface of the lead tab via an end surface of the lead tab.

7. The rechargeable battery of claim 4, wherein the first side surface has a reinforced portion at an inner surface thereof, the reinforced portion being thicker than other portions of the first side surface.

8. The rechargeable battery of claim 4, wherein the first exhaust guide member comprises
a vertical portion which defines the second opening; and
wherein the inclined portion connects a lower end of the vertical portion to the first opening.

9. The rechargeable battery of claim 8, further comprising a second exhaust guide member spaced from the first exhaust guide member in a direction of the cell fuse.

10. The rechargeable battery of claim 9, wherein the vertical portion of the first exhaust guide member is formed to be longer than a vertical portion of the second exhaust guide member.

11. The rechargeable battery of claim 10, wherein the inclined portion of the first exhaust guide member is inclined steeper than an inclined portion of the second exhaust guide member.

12. The rechargeable battery of claim 8, wherein the vertical portion includes:
a fourth side surface formed at the rear of the first opening toward the electrode assembly and in parallel with the first side surface; and
a fifth side surface and a sixth side surface connected to the second opening opposite to the second side surface and the third side surface, respectively.

13. The rechargeable battery of claim 12, wherein the fifth side surface and the sixth side surface each have a pair of cut-outs that are planar with each other and middle portions between a respective one of the pair of cut-outs and protruding toward the second and third side surfaces.

14. The rechargeable battery of claim 13, wherein the middle portions between the pair of cut-outs have protrusions that respectively protrude toward the second and third side surfaces.

* * * * *